May 5, 1970  H. R. KARLEN  3,510,627
HOT WATER SUPPLY APPARATUS
Filed May 26, 1967
2 Sheets-Sheet 2
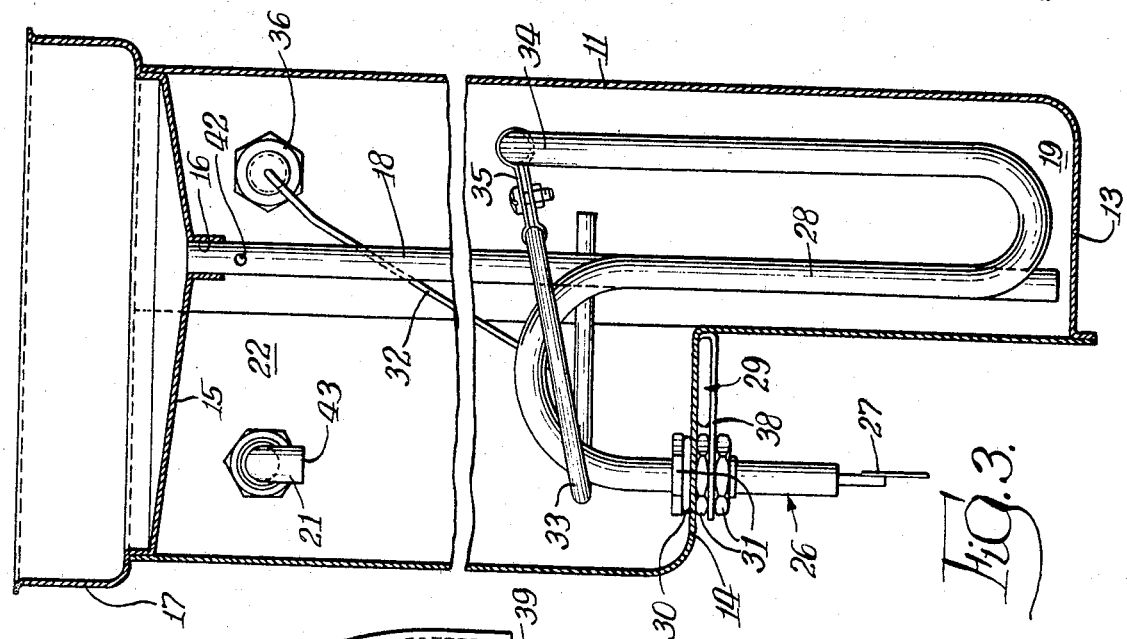
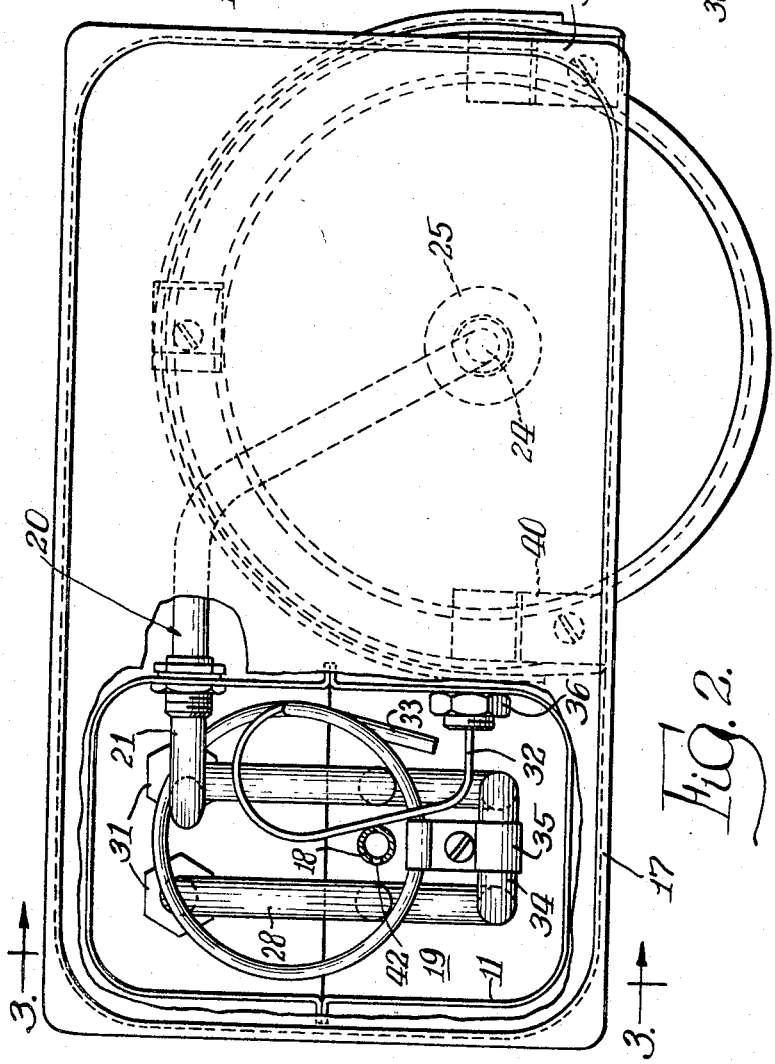

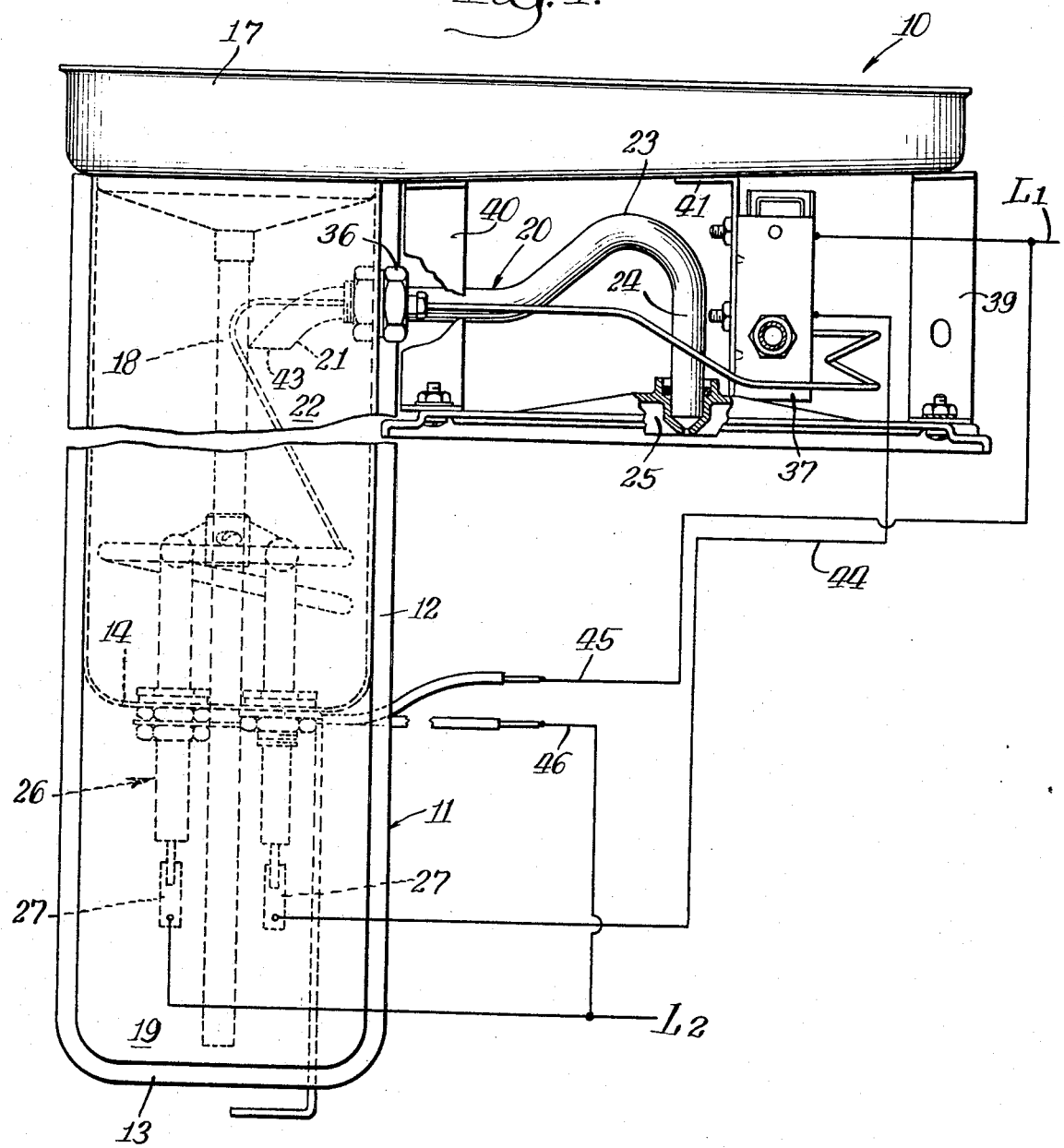

United States Patent Office 3,510,627
Patented May 5, 1970

3,510,627
HOT WATER SUPPLY APPARATUS
Harvey R. Karlen, Chicago, Ill., assignor to Cory Corporation, a corporation of Delaware
Filed May 26, 1967, Ser. No. 641,519
Int. Cl. H05b 1/00
U.S. Cl. 219—320      9 Claims

ABSTRACT OF THE DISCLOSURE

A hot water supply for apparatus such as a coffee brewing apparatus wherein water is maintained hot in the tank for substantially immediate dispensing when desired. The tank is of the pour-through type wherein a preselected quantity of cold water is delivered into the tank to displace a corresponding quantity of hot water from the tank. The tank is provided with an electric heater structure which is arranged to minimize vaporization while maintaining the water at the desired temperature.

---

This invention relates to hot water supply apparatus and in particular to hot water supply apparatus of the pour-through type.

In one conventional form of pour-through hot water supply apparatus, a tank is provided with an inlet, a basin into which water is poured as from a decanter and from which the water is delivered into the tank, and an outlet having an opening to an upper portion of the tank for delivering hot water from the tank as an incident of the delivery of cold water into the basin and tank. In such a hot water supply apparatus, it is desirable to maintain the water in the tank at a preselected high temperature, such as approximately 200° F. It is also conventional to vent the upper portion of the tank for facilitated use of a siphon outlet structure conventionally provided for preventing drip as a result of the expansion of the water in the tank by the heating thereof. A problem arises in the provision of the known heating means in that substantial vaporization is effected thereby causing the level of the water in the tank to drop undesirably so that should the tank be allowed to stand for a protracted period of time the first delivery of hot water therefrom may have a volume substantially smaller than desired. In the extreme, such vaporization may eventually permit the level to drop below the heating means which conventionally comprises an electric heating coil within the tank and, thus, possibly cause serious damage and fire hazard.

The present invention comprehends an improved hot water supply apparatus avoiding the above discussed disadvantages of the conventional hot water supply apparatuses in a novel and simple manner.

Thus, a principal feature of the present invention is the provision of a new and improved hot water supply apparatus.

A further feature of the invention is the provision of such an apparatus having new and improved means for maintaining the water at a desired high temperature while yet effectively precluding undesirable vaporization of the water to effectively maintain the level of the water in the tank for relatively long periods of time.

Another feature of the invention is the provision of such an apparatus wherein a plurality of heating elements are provided, one of which has a relatively low rate of heat delivery to effectively minimize vaporization of water in the tank while effectively maintaining the temperature of the water substantially at the preselected high temperature for a substantial period of time notwithstanding a loss of heat energy from the water through the tank.

Still another feature of the invention is the provision of such a hot water supply apparatus further having a second heating element having a rate of heat delivery substantially higher than the low heat delivery element for quickly bringing the water to the preselected high temperature.

A yet further feature of the invention is the provision of such an apparatus wherein the outlet defines a gooseneck siphon and the vent opening is of smaller cross section than said siphon with the relatively low heating rate of the first heating element effectively precluding pressure development within the tank tending to urge water outwardly through the siphon.

In summary, the invention comprehends an improved hot water supply apparatus having a plurality of heating elements for effectively maintaining the water in a pour-through type heating tank at a preselected high temperature while effectively minimizing vaporization thereof and minimizing pressure buildup to preclude undesirable delivery of slugs of water through the outlet.

Other features and advantages of the invention will be apparent from the following description taken in connection with the accompanying drawings wherein:

FIG. 1 is a side elevation of a hot water supply apparatus embodying the invention, with portions broken away to facilitate illustration of the invention and with the electrical wiring thereof shown schematically;

FIG. 2 is a top plan view thereof; and

FIG. 3 is a vertical section taken substantially along the line 3—3 of FIG. 2.

In the exemplary embodiment of the invention as disclosed in the drawings, a hot water supply apparatus generally designated 10 is shown to comprise a pour-through apparatus wherein a tank 11 is provided with a side wall 12, a bottom wall 13, an upwardly stepped intermediate horizontal wall 14 and a top wall 15 defining an inlet opening 16. The top wall 15, as shown in FIG. 3, may comprise a well portion of a basin 17 superposed on the tank. In such a pour-through apparatus, cold water is poured into the basin 17 to flow downwardly therefrom through the opening 16 and a conduit 18 depending therefrom to flow into the tank in a lower portion 19 thereof adjacent bottom wall 13. Hot water is delivered from the tank through a gooseneck siphon outlet 20 having a downturned inner portion 21 opening into an upper portion 22 of the tank, a U-shaped portion 23 exteriorly of the tank and a downturned portion 24 for delivering the hot water through an outlet fitting 25 as to a beverage brewing cartridge (not shown).

The water in the tank is heated therein by a plurality of electrical heaters including a first, high wattage, electrical heating element 26 for raising the temperature of the water to the preselected high temperature which is preferably slightly less than boiling temperature and, illustratively, may be approximately 200° F. As shown in FIG. 3, heater 26 includes a pair of terminals 27 exteriorly of the tank 11 subjacent intermediate wall 14, and an internal heating coil portion 28 within the tank and extending downwardly to tank space 19. A second, low wattage, electrical heating element 29 is provided subjacent wall 14 for heating the water in the tank at a rate substantially less than the rate of the high heat element 26 to effectively maintain the temperature of the water in the tank at the preselected high temperature while effectively minimizing vaporization thereof. Illustratively, the wattage of the high heat element 26 may be at least ten times the wattage of the low heat element 29, and in the illustrative embodiment, is over thirty times the low heat element wattage, the element 26 comprising a 1500 watt electrical heating element and the auxiliary low heat element 29 comprising a 45 watt electrical heating element. The high wattage element 26 may have a relatively short length so as to have a relatively high linear watt density thereby providing a facilitated and economical construction.

The high heat element may extend through the wall 14, as shown in FIG. 3, and is sealed to the wall a suitable gasket 30 and nut means 31. The temperature of the water is sensed by a thermostatic sensing element 32 having an inner sensing portion 33 secured to an inner end 34 of the high heat element 26 by a suitable clamp 35. The element 32 extends outwardly through the tank side wall 12 through a sealing connector 36 and is connected to a thermostat switch 37 for controlling the electrical operation of the heater 26. Heater 29 may be maintained in thermal transfer association with the tank wall 14 by a suitable bracket 38 secured by the nuts 31. The basin 17 may be supported on suitable brackets 39 and 40, as well as on the upper end of the tank 11, and switch 37 may be carried on a suitable bracket 41 secured to the basin 17. The inlet conduit 18 is provided with a small vent opening 42 closely subjacent the top wall 15 and above the level of the inner end 43 of the outer siphon portion 21.

Electrical power may be supplied to the apparatus 10 from a suitable power supply including power supply from a suitable power supply including power supply lead $L_1$ and $L_2$. Switch 37 comprises a single pole, single throw switch for selectively breaking a circuit between lead $L_1$ and wire 44 connected to one terminal 27 of the high wattage heater 26. The other terminal of the high wattage heater is connected to power supply lead $L_2$ and, thus, the high wattage heater is selectively energized across the power supply leads under the control of the thermostat switch 37 which is responsive to the temperature of the water sensed by the element 32 within the tank 11. Illustratively, the switch may be adjusted to energize the high wattage heater 26 when the temperature is below 198° F. and discontinue energizing the heater when the temperature reaches 203° F. The low wattage heater 29 is connected electrically across power supply leads $L_1$ and $L_2$ by wires 45 and 46 so as to be energized continuously.

The operation of apparatus 10 is extremely simple. When cold water is poured into the basin 17 as from a decanter, it flows downwardly through the conduit 18 into the lower portion 19 of the tank 11. The introduction of the cold water raises the level of water in the tank until the level reaches the upper portion of the gooseneck 23 of the siphon outlet 20. Thereupon, the hot water at the top of the tank commences flow outwardly through the outlet 20 and outlet fitting 25 as for brewing a preselected quantity of beverage such as coffee or the like. The flow of hot water continues after termination of delivery of cold water to the tank until the level drops to the distal end 43 of the outlet in the tank at which time the siphon suction is broken. The dropping of the level is facilitated by the vent 42 in the conduit 28 which permits air flow into the upper portion of the tank at this time. As the temperature of the cold water is below the preselected temperature of the switch 37, the switch closes and energizes the high wattage heater to commence heating of the water in the tank at a relatively high rate. As the water is heated, it expands and the level thereof rises to above the outlet end 43 closing off the outlet tube. The arrangement of the siphon, however, is such as to accommodate the maximum expansion of the cold water within the tank due to the heating thereof, the maximum level thereof being always below the upper portion of the gooseneck 23. Thus, undesirable drip of the hot water from the tank as a result of such expansion is effectively precluded. During the rise of the level in the tank above the level of siphon end 43, air is continuously slowly expelled outwardly through the vent 42 thereby precluding pressure buildup in the upper portion of the tank tending to urge the hot water outwardly through the outlet tube 20.

When the temperature of the water in the tank reaches the upper limit of thermostat switch 37, the thermostat switch opens, thereby de-energizing the high wattage heater 26. However, the low wattage heater 29 is maintained energized to offset heat loss through the tank and thereby effectively maintain the temperature of the water in the tank at the desired temperature of approximately 200° F. for relatively long periods of time without requiring re-energization of the high wattage heater 26. Illustratively, the wattage of the heater 29 may be sufficient to maintain the desired temperature of the hot water for approximately fifteen minutes or longer. As the heating of the water in the tank, therefore, is effected preponderantly by the low wattage heater 29 which effectively minimizes vaporization of the water, the level of water in the tank is maintained for correspondingly long periods of time while yet the temperature thereof is maintained at the brewing temperature for immediate delivery of the hot water as desired. As the low wattage heater 29 effectively minimizes vaporization, there is substantially no tendency for pressure buildup in the upper portion 22 of the tank tending to force slugs of water outwardly through the siphon tube 20 notwithstanding the small size of the vent opening 42.

Thus, the improved hot water supply apparatus 10 provides an improved vented siphon delivery of the hot water while yet effectively precludes undesirable dripping of the hot water as caused by pressure buildup in conventional pour-through type apparatuses wherein relatively high heat elements are utilized for maintaining the desired water temperature.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a coffee brewing apparatus wherein water is maintained hot for substantially immediate dispensing when desired, such brewing apparatus having a tank provided with an inlet, basin means for receiving poured water, means for conducting water from said basin through said inlet into a lower portion of said tank, an outlet having an opening to an upper portion of said tank for conducting water from said tank as an incident of delivery of water through said inlet into said tank, and means opening into said tank above the level of said outlet for venting the upper portion of the tank to atmosphere, the improvement comprising: first heating means for heating water in said tank seriatim to a preselected high temperature less than the boiling temperature at a preselected high rate; and second heating means for heating the water in said tank at a rate substantially lower than said preselected rate to effectively minimize vaporization of the water while maintaining the temperature of the water substantially at said preselected high temperature for a substantial period of time notwithstanding a loss of heat energy from the water through said tank thereby to effectively minimize the seriatim heating operations of said first heating means.

2. The apparatus of claim 1 including for energizing said second heating means continuously.

3. The apparatus of claim 1 wherein said venting means is smaller in cross section than is said outlet and said second heating means is arranged to heat the water in the tank at a rate sufficiently low to permit water vapor produced thereby to pass from said tank through said venting means rather than through said outlet when the level of water in the tank is above said outlet opening thereby to preclude forcing of a portion of said water outwardly through said outlet by said vapors.

4. The apparatus of claim 1 wherein means are associated with said tank for effectively limiting heat loss therefrom to permit said second heating means to maintain the temperature of the water substantially at said preselected temperature for at least approximately fifteen minutes.

5. The apparatus of claim 1 wherein said high heating rate of said first heating means is at least approximately ten times the heating rate of said second heating means.

6. The apparatus of claim 1 wherein said high heating rate of said first heating means is at least approximately thirty times the heating rate of said second heating means.

7. The apparatus of claim 1 wherein said first heating means comprises a short electrical heater having a high linear watt density.

8. The apparatus of claim 1 wherein said first heating means comprises an electrical heater disposed within said tank and said second heating means comprises an electrical heater disposed exteriorly of said tank.

9. The apparatus of claim 1 wherein said outlet comprises a gooseneck siphon tube and the water level in said tank is normally above said opening when the water is approximately said preselected temperature whereby said tube is normally blocked by a body of hot water therein at said opening.

References Cited

UNITED STATES PATENTS

| | | | |
|---|---|---|---|
| 2,269,448 | 1/1942 | Ferris | 219—324 XR |
| 2,422,492 | 6/1947 | Losee | 99—300 XR |
| 2,552,169 | 5/1951 | Graham | 99—282 |
| 2,694,770 | 11/1954 | Sullivan. | |
| 3,220,334 | 11/1965 | Martin | 99—282 |
| 3,354,810 | 11/1967 | Lorang | 99—282 |
| 3,366,034 | 1/1968 | Karlen | 99—282 |

JOSEPH V. TRUNE, Primary Examiner

C. L. ALBRITTON, Assistant Examiner

U.S. Cl. X.R.

219—321